US012811480B2

(12) United States Patent
Goto

(10) Patent No.: US 12,811,480 B2
(45) Date of Patent: Nov. 24, 2026

(54) VOICE COIL MOTOR, MAGNETIC CIRCUIT CONFIGURATION COMPONENT THEREFOR, AND MANUFACTURING METHOD THEREFOR

(71) Applicant: SHIN-ETSU CHEMICAL CO., LTD., Tokyo (JP)

(72) Inventor: Akira Goto, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 111 days.

(21) Appl. No.: 18/680,659

(22) Filed: May 31, 2024

(65) Prior Publication Data

US 2024/0429804 A1 Dec. 26, 2024

(30) Foreign Application Priority Data

Jun. 23, 2023 (JP) ................................ 2023-103424
Feb. 27, 2024 (JP) ................................ 2024-027721

(51) Int. Cl.

*H02K 1/02* (2006.01)
*H02K 15/03* (2006.01)
*H02K 41/06* (2006.01)

(52) U.S. Cl.

CPC ............... *H02K 41/06* (2013.01); *H02K 1/02* (2013.01); *H02K 15/03* (2013.01)

(58) Field of Classification Search

CPC .......... H02K 1/02; H02K 15/03; H02K 41/06; G11B 5/5569; G11B 5/5573
See application file for complete search history.

(56) References Cited

U.S. PATENT DOCUMENTS 5,822,156 A * 10/1998 Suzuki ................. G11B 5/5521 360/99.18
6,340,888 B1 * 1/2002 Aoki .................... G01R 33/383 324/319

(Continued)

FOREIGN PATENT DOCUMENTS

JP H04302873 A * 10/1992
JP 2001230106 A 8/2001

(Continued)

OTHER PUBLICATIONS

JP-H04302873-A Machine Translation (Year: 1992).*

(Continued)

*Primary Examiner* — Oluseye Iwarere
*Assistant Examiner* — Masoud Vaziri
(74) *Attorney, Agent, or Firm* — Myers Bigel, P.A.

(57) ABSTRACT

A magnetic circuit configuration component for a VCM includes a pair of yokes, a pair of magnets provided on inner surfaces of the yokes, and a support member or a support column that maintains a gap between the magnets to fix the yokes to each other, the magnet is a rare earth sintered magnet having a surface on which coating is performed, a composition of the magnet consists of, by weight, R (R is one or more types of rare earth elements selected from Nd, Pr, Dy, Tb, Ce, La, and Gd) of 28% to 34%, Co of 2% or less, B of 0.5% to 2%, one or more types selected from Ni, Nb, Al, Ti, Zr, Cr, V, Mn, Mo, Si, Sn, Ga, Cu, and Zn as an additive of 2% or less, and the balance of Fe, and the coating includes a metal plating layer of a predetermined thickness and a metal oxide layer and/or a metal nitride layer of 0.01 μm to 2 μm.

3 Claims, 8 Drawing Sheets

(56) References Cited

U.S. PATENT DOCUMENTS

| | | | | |
|---|---|---|---|---|
| 2005/0028890 | A1* | 2/2005 | Sakaki | H01F 41/026 148/105 |
| 2005/0254177 | A1 | 11/2005 | Suzuki et al. | |
| 2009/0141400 | A1 | 6/2009 | Tanabe | |
| 2018/0137974 | A1* | 5/2018 | Kuribayashi | C22C 38/02 |
| 2020/0258544 | A1 | 8/2020 | Kobayashi | |
| 2020/0265868 | A1* | 8/2020 | Takahashi | G11B 5/5573 |
| 2020/0299813 | A1 | 9/2020 | Tsubokura et al. | |
| 2022/0344080 | A1* | 10/2022 | Nakamura | C23C 14/3414 |
| 2023/0005646 | A1* | 1/2023 | Kume | C22C 33/0278 |

FOREIGN PATENT DOCUMENTS

| | | | | |
|---|---|---|---|---|
| JP | 2001250707 | A | | 9/2001 |
| JP | 2001257112 | A | | 9/2001 |
| JP | 2003257721 | A | | 9/2003 |
| JP | 2003257768 | A | | 9/2003 |
| JP | 2004023969 | A | * | 1/2004 |
| JP | 2005327407 | A | | 11/2005 |
| JP | 2009140524 | A | | 6/2009 |
| JP | 2020129424 | A | | 8/2020 |
| JP | 2020161812 | A | | 10/2020 |

OTHER PUBLICATIONS

JP-2004023969-A Machine Translation (Year: 2004).*

Techno Takatsuki Co. , "Development of Blower for Innovative Fuel Cell System That Is Indispensable for Realizing Hydrogen Society" with English language translation, URL: https://webmagazine.nedo.go.jp/practical-realization/articles/201701techno-takasuki/, Nov. 2016, 25 pp.

"Notice of Reasons for Refusal with English language translation", JP Application No. 2024-027721, Oct. 2, 2026, 15 pp.

* cited by examiner

VOICE COIL MOTOR, MAGNETIC CIRCUIT CONFIGURATION COMPONENT THEREFOR, AND MANUFACTURING METHOD THEREFOR

RELATED APPLICATIONS

This application claims priority under 35 U.S.C. § 119 to Japanese Application No. 2023-103424, filed Jun. 23, 2024, and also claims priority to Japanese Application No. 2024-027721, filed Feb. 27, 2024, the disclosures of both of which are incorporated by reference herein in their entireties.

BACKGROUND OF THE INVENTION

Field of the Invention

The present invention relates to voice coil motors, magnetic circuit configuration components for voice coil motors, and manufacturing methods for magnetic circuit configuration components.

Description of Related Art

A voice coil motor (hereinafter, also referred to as a VCM) is a magnetic circuit component used to drive an actuator in a hard disk drive (hereinafter, also referred to as an HDD). Generally, during an operation of the HDD, when a current flows through a coil provided in the actuator, the actuator is moved to a specific position on a magnetic medium by a Lorentz force, and data is read from and written to the magnetic medium by using a head at a tip of the actuator.

As the magnetic medium in which data is read and written by the VCM in this manner, in addition to a disk-shaped magnetic disk as disclosed in Patent Document 1, there is an embedded magnetic tape or the like that is wound and rewound by two reels as disclosed in Patent Document 2. A storage that uses the embedded magnetic tape as in Patent Document 2 is called a tape storage. In the VCM, when a current is passed through a coil in a magnetic field of a permanent magnet, a force is generated in a direction perpendicular to the magnetic field in the coil, and it is possible to perform a reciprocating motion on the coil.

On the other hand, as the permanent magnet, in Patent Document 3 and Patent Document 4, as a rare earth sintered magnet capable of being used for a motor or the like without causing hydrogen embrittlement even in a hydrogen atmosphere, there is described a rare earth sintered magnet and a manufacturing method therefor, consisting of R (R is one or two or more types of rare earth elements selected from Nd, Pr, Dy, Tb, and Ho) of 20% to 35% by weight, Co of 15% by weight or less, B of 0.2% to 8% by weight, at least one type of element selected from Ni, Nb, Al, Ti, Zr, Cr, V, Mn, Mo, Si, Sn, Ga, Cu, and Zn as an additive of 8% by weight or less, and the balance of Fe with inevitable impurities, in which a metal oxide layer and/or a metal nitride layer is provided on a surface of the rare earth sintered magnet body directly or via an n-layer (n is an integer and $n \geq 1$) metal plating layer.

The “motor” described in Patent Document 3 and Patent Document 4 is completely different from the VCM. As described in Non-Patent Document 1, in a case of developing an electromagnetic diaphragm blower in order to put a hydrogen circulation blower for a fuel cell system into practical use, a problem occurs in that a component using a permanent magnet in the blower is embrittled in an assumed use environment. At the times at which Patent Document 3 and Patent Document 4 were filed, in order to realize a hydrogen energy society, research on a supply power of hydrogen fuel has been active, and a problem occurs in that a permanent magnet mounted on a rotary motor deteriorates by being exposed to hydrogen. Patent Document 3 and Patent Document 4 relate to a rare earth sintered magnet mounted on such a rotary motor.

REFERENCE DOCUMENT LIST

Patent Documents

Patent Document 1: JP 2009-140524 A
Patent Document 2: JP 2020-129424 A
Patent Document 3: JP 2003-257721 A
Patent Document 4: JP 2003-257768 A

Non-Patent Document

Non-Patent Document 1: NEDOWM (NEDO Web Magazine), “Development of blower for innovative fuel cell system that is indispensable for realizing hydrogen society”, November 2016, (URL: https://webmagazine.nedo.go.jp/practical-realization/articles/201701techno-takatsuki/)

SUMMARY OF THE INVENTION

Problem to be Solved by the Invention

As described in Patent Document 1 and Patent Document 2, a storage device such as an HDD or a tape storage needs to be sealed by filling an inside of a housing with helium in order to reduce vibration of a magnetic head or a magnetic disk. In addition, there is a demand for using hydrogen gas instead of helium in view of the high cost of helium and the desirability of a gas having a lower density. In addition, the VCM used in the storage device includes the permanent magnet as described above. As described in Patent Document 3 and Patent Document 4, it has been pointed out that, in a case in which the permanent magnet is exposed to a high-pressure hydrogen atmosphere for a long time, hydrogen embrittlement is caused, and the material is broken, cracked, or pulverized.

In a case in which the housing of the storage device, such as the HDD, is filled with hydrogen, the VCM is placed in a low-pressure hydrogen atmosphere, unlike a case of the rotary motor of Patent Document 3 and Patent Document 4. Patent Document 3 and Patent Document 4 describe that chipping or the like hardly affects magnetic properties of the permanent magnet itself, and as a comparative example, a test sample not having a metal oxide layer, which is a feature of the invention of the document, is described to be broken into pieces in a hydrogen gas test of 10 MPa, and there is no description of a change in magnetic properties of the permanent magnet exposed to a hydrogen atmosphere.

The present inventor tested a resistance of a permanent magnet to low-pressure hydrogen in a case in which a VCM is exposed to the low-pressure hydrogen atmosphere for a long time, and surprisingly, has found that although damage such as chipping or cracking did not occur to a certain extent even for the permanent magnet having only a metal plating layer without a metal oxide layer which is a feature of the invention described in Patent Document 3 and Patent Document 4, magnetic properties of the permanent magnet deteriorated without such damage, and the permanent magnet was not able to withstand use in a VCM.

Therefore, the present invention has been made in view of the problems described above, and an object of the present invention is to provide a voice coil motor capable of preventing damage such as chipping or cracking from occurring even in a case of being exposed to a low-pressure hydrogen atmosphere for a long time and preventing deterioration of magnetic properties, a magnetic circuit configuration component for the voice coil motor, and a manufacturing method of the magnetic circuit configuration component.

Means for Solving the Problem

In order to achieve the object described above, a voice coil motor according to the present invention, a magnetic circuit configuration component for the voice coil motor, and a manufacturing method of the magnetic circuit configuration component are as follows.

(1) There is provided a magnetic circuit configuration component for a voice coil motor, including: a pair of yokes; a pair of magnets respectively provided in contact with inner surfaces of the pair of yokes; and a support member that maintains a gap between the pair of magnets and fixes the pair of yokes to each other, in which the magnet is a rare earth sintered magnet having a surface on which coating is performed, the rare earth sintered magnet has a composition consisting of R (R is one or two or more types of rare earth elements selected from Nd, Pr, Dy, Tb, Ce, La, and Gd) of 28% to 34% by weight, Co of 2% or less by weight, B of 0.5% to 2% by weight, at least one type of element selected from Ni, Nb, Al, Ti, Zr, Cr, V, Mn, Mo, Si, Sn, Ga, Cu, and Zn as an additive of 2% or less by weight, and the balance of Fe with inevitable impurities, and the coating has a multi-layer structure consisting of a metal plating layer and a metal oxide layer and/or a metal nitride layer in order from a rare earth sintered magnet side, the metal plating layer further has a multi-layer structure consisting of a copper plating layer and a nickel plating layer in order from the rare earth sintered magnet side, a total thickness of the metal plating layer and the metal oxide layer and/or the metal nitride layer is in a range of 3 μm to 80 μm, and a thickness of the metal oxide layer and/or the metal nitride layer is in a range of 0.01 μm to 2 μm.

(2) There is provided a voice coil motor including: the magnetic circuit configuration component for a voice coil motor according to (1) described above; and a coil that is located in the gap between the pair of magnets.

(3) There is provided a manufacturing method of a magnetic circuit configuration component for a voice coil motor, the method including: forming a pair of plates consisting of a rare earth sintered magnet having a composition consisting of R (R is one or two or more types of rare earth elements selected from Nd, Pr, Dy, Tb, Ce, La, and Gd) of 28% to 34% by weight, Co of 2% or less by weight, B of 0.5% to 2% by weight, at least one type of element selected from Ni, Nb, Al, Ti, Zr, Cr, V, Mn, Mo, Si, Sn, Ga, Cu, and Zn as an additive of 2% or less by weight, and the balance of Fe with inevitable impurities; applying copper plating to surfaces of the pair of plates and applying nickel plating to the copper-plated surfaces to form metal plating layers; performing a heat treatment on the pair of plates on which the metal plating layers are formed to oxidize and/or nitride a metal of the metal plating layer, to form a metal oxide layer and/or a metal nitride layer, a total thickness of the metal plating layer and the metal oxide layer and/or the metal nitride layer being in a range of 3 μm to 80 μm, and a thickness of the metal oxide layer and/or the metal nitride layer being in a range of 0.01 μm to 2 μm; respectively adhering a pair of yokes to the pair of plates on which the metal oxide layers and/or the metal nitride layers are formed; and fixing the pair of yokes to each other with a support member such that the pair of plates adhered to the pair of yokes face each other and a gap is maintained between the pair of plates.

Effects of the Invention

In this manner, according to the present invention, by using a rare earth sintered magnet in which coating is formed on a surface as a pair of magnets in a magnetic circuit configuration component for a voice coil motor, by setting the rare earth sintered magnet to have a predetermined composition in which the coating has a multi-layer structure consisting of a predetermined metal plating layer and a metal oxide layer and/or a metal nitride layer on the metal plating layer, by setting a total thickness of the metal plating layer and the metal oxide layer and/or the metal nitride layer to be in a predetermined range, and by setting a thickness of the metal oxide layer and/or the metal nitride layer to be in a predetermined range, it is possible to prevent a damage such as chipping or cracking from occurring in the magnet even if the voice coil motor is exposed to a low-pressure hydrogen atmosphere for a long time, and it is possible to prevent deterioration of magnetic properties of the magnet.

DESCRIPTION OF PREFERRED EMBODIMENTS

Hereinafter, a description of an embodiment of a voice coil motor according to the present invention, a magnetic circuit configuration component for the voice coil motor, and a manufacturing method of the magnetic circuit configuration component will be made with reference to the accompanying drawings.

Figure 1:
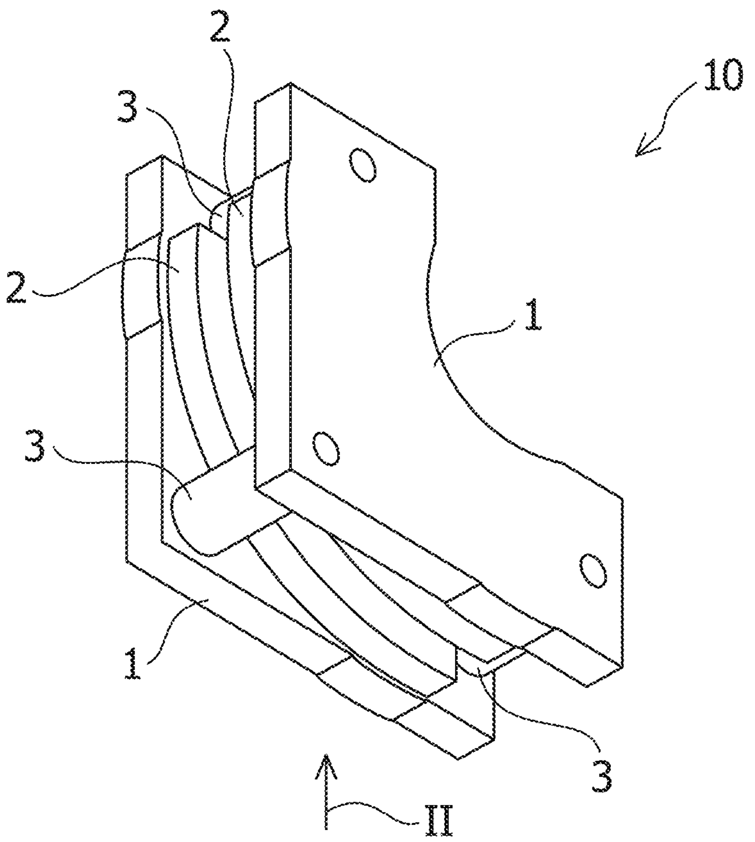
FIG. 1 is a schematic perspective view illustrating one embodiment of a magnetic circuit configuration component for a VCM according to the present invention.
Figure 2:
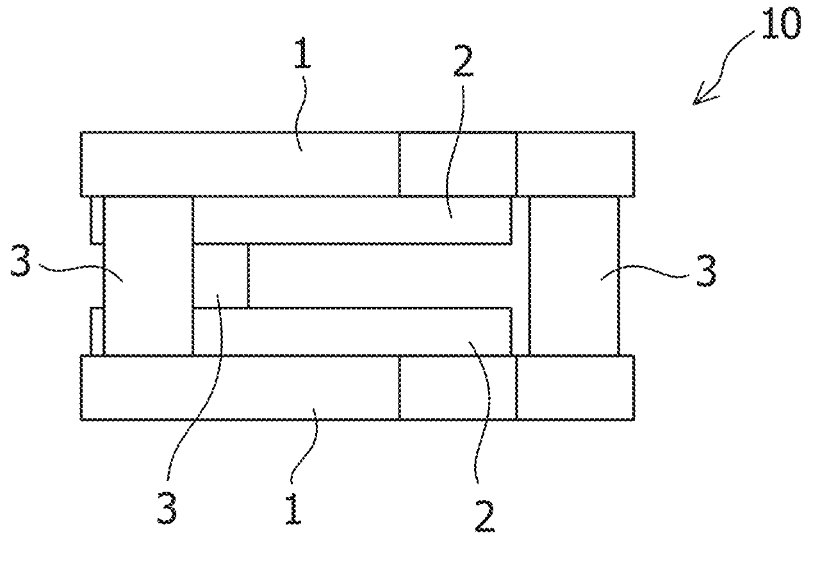
FIG. 2 is a schematic front view of the magnetic circuit configuration component of FIG. 1 as viewed from an arrow II.

As illustrated in FIGS. 1 and 2, a magnetic circuit configuration component 10 for a VCM according to the present embodiment is mainly configured with a pair of plate-shaped yokes 1, a pair of plate-shaped magnets 2 respectively provided in contact with inner surfaces of the pair of plate-shaped yokes 1, and a plurality of pins 3 that maintains a gap between the pair of plate-shaped magnets 2, and fixes the pair of plate-shaped yokes 1 to each other. It is possible to set the VCM by installing a coil (not illustrated) in the gap between the pair of plate-shaped magnets 2 of the magnetic circuit configuration component 10.

In FIGS. 1 and 2, the entire yoke 1 is represented as a plate in a planar shape, and the yoke 1 may have a part of an unevenness, a step, or the like in an outer peripheral portion of a contact surface with the magnet 2. In addition, in FIGS. 1 and 2, as an example of a case in which a magnetic medium is a magnetic disk having a disk shape, a shape of the magnet 2 is drawn in an arc shape. In addition, the present invention is not limited to this, and the shape of the magnet 2 may be appropriately set to a desired shape in accordance with a trajectory or the like of a reciprocating motion by the VCM on the magnetic medium. In addition, for example, a center yoke or a magnet fixed to the center yoke may be provided in the gap between the pair of plate-shaped magnets 2, in addition to the pair of plate-shaped yokes 1.

Figure 3:
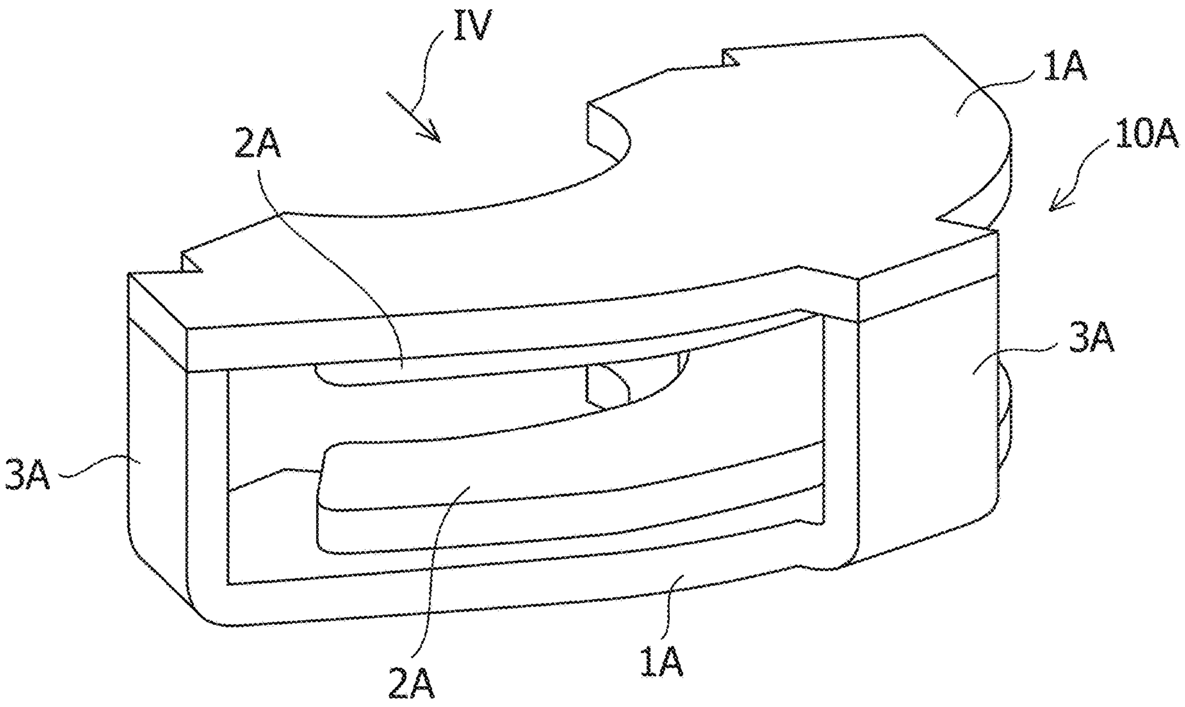
FIG. 3 is a schematic perspective view illustrating another embodiment of the magnetic circuit configuration component for the VCM according to the present invention.
Figure 4:
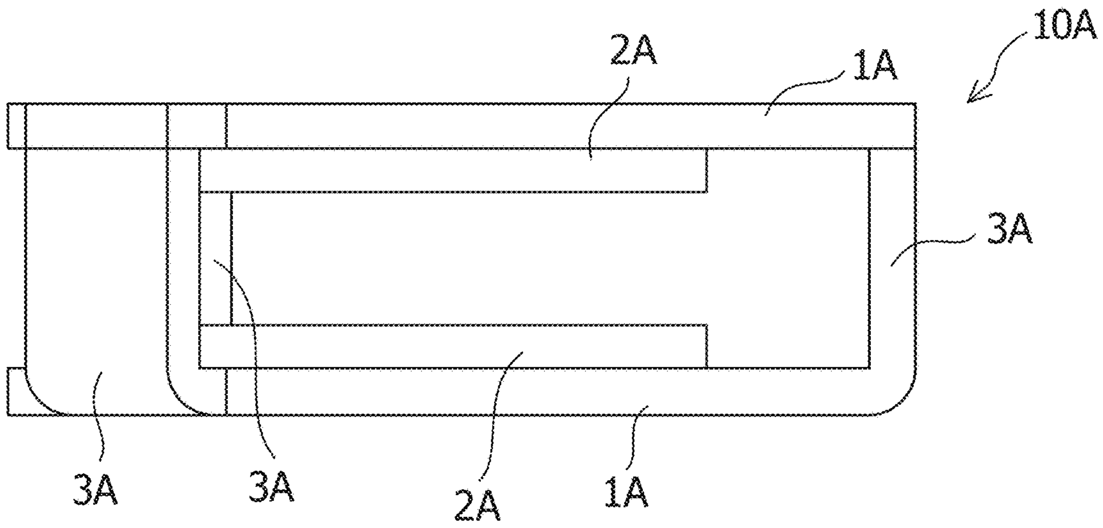
FIG. 4 is a schematic front view of the magnetic circuit configuration component of FIG. 3 as viewed from an arrow IV.

In addition, the magnetic circuit configuration component for the VCM according to the present invention is not limited to the embodiment illustrated in FIGS. 1 and 2, and may be, for example, another embodiment illustrated in FIGS. 3 and 4. As illustrated in FIGS. 3 and 4, in a magnetic circuit configuration component 10A for the VCM, a pair of plate-shaped yokes 1A and a pair of plate-shaped magnets 2A respectively provided in contact with inner surfaces of the pair of plate-shaped yokes 1A have the same manner as the above description. In addition, as support members that maintain a gap between the pair of plate-shaped magnets 2A and fix the pair of plate-shaped yokes 1A to each other, a plurality of support columns 3A which is the bent yoke is provided.

A material of the yoke 1 is a material in the related art, which is used for the yoke of the VCM. For example, a steel plate cold commercial (SPCC) material, a stainless steel material, or the like may be used without being particularly limited.

The plate-shaped magnet 2 is attached to the inner surface of the plate-shaped yoke 1 by an adhesive (not illustrated). The adhesive is not particularly limited, and from the viewpoint of preventing foreign matter from adhering to an actuator or the like, an adhesive having low outgassing is used. For example, an adhesive such as an acrylic-based adhesive or an epoxy-based adhesive is used.

The plate-shaped magnet 2 is a rare earth sintered magnet having a coated surface. The rare earth sintered magnet has a composition consisting of R (R is one or two or more types of rare earth elements selected from Nd, Pr, Dy, Tb, Ce, La, and Gd) of 28% to 34% by weight, Co of 2% or less by weight, B of 0.5% to 2% by weight, at least one type of element selected from Ni, Nb, Al, Ti, Zr, Cr, V, Mn, Mo, Si, Sn, Ga, Cu, and Zn as an additive of 2% or less by weight, and the balance of Fe with inevitable impurities.

The coating on the surface of the rare earth sintered magnet has a multi-layer structure consisting of a metal plating layer and a metal oxide layer and/or a metal nitride layer, in this order, from the rare earth sintered magnet side. The metal plating layer further has a multi-layer structure consisting of a copper plating layer and a nickel plating layer, in this order, from the rare earth sintered magnet side. The metal oxide layer and/or the metal nitride layer is formed by performing a heat treatment on the metal plating layer described above.

The number of the metal plating layers is preferably 2 to 5. In addition, a total thickness of the metal plating layer and the metal oxide layer and/or the metal nitride layer is preferably set in a range of 3 μm to 80 μm, and more preferably set to a range of 5 μm to 60 μm. If the total thickness exceeds 80 μm, it takes time and is expensive, and efficient production cannot be performed, and magnetic properties may be adversely affected. On the other hand, if the thickness is less than 3 μm, it is not possible to improve an impact resistance of the sintered magnet body itself, so that chipping or the like cannot be prevented and an unevenness in the metal plating is likely to occur and pinholes are likely to be formed, which may result in insufficient formation of the metal oxide layer and/or the metal nitride layer.

A thickness of the metal oxide layer and/or the metal nitride layer is preferably in a range of 0.01 μm to 2 μm. If the thickness of the metal oxide layer and/or the metal nitride layer exceeds 2 μm, it takes time and is expensive, and efficient production cannot be performed, and the magnetic properties may be adversely affected. On the other hand, if the thickness is less than 0.01 μm, an action and a function of the metal oxide layer and/or the metal nitride layer cannot be sufficiently exhibited. The thickness of the metal oxide layer and/or the metal nitride layer can be measured by performing analysis of an element concentration and a chemical bonding state in a depth direction of a cross section of the magnet 2 by an X-ray photoelectron spectroscopy (XPS).

In this manner, by forming the surface coating of the metal plating layer and the metal oxide layer and/or the metal nitride layer on the surface of the rare earth sintered magnet, it is possible to prevent damage such as chipping or cracking of the pair of magnets 2 from occurring even if the VCM is exposed to a hydrogen atmosphere in a housing of a storage device such as the HDD for a long time, and it is possible to prevent the magnetic properties of the pair of magnets 2 from deteriorating due to the hydrogen exposure. Therefore, even if an inside of the housing is filled with hydrogen instead of helium, precise control of the actuator by the VCM can be maintained, and data can be accurately read from and written to the magnetic medium.

A material of the coil used for using the magnetic circuit configuration component for the VCM as the VCM is a material in the related art, which is used for the coil of the VCM. For example, copper or the like is preferably used without being particularly limited. It is preferable that the coil be wound around one of the yoke 1 and the magnet 2 to be movable.

Next, a manufacturing method of the magnetic circuit configuration component for the VCM according to the present embodiment will be described. Since the magnetic circuit configuration component has already been described, detailed description thereof will be omitted here.

The manufacturing method of the magnetic circuit configuration component for the VCM according to the present embodiment includes (1) a step of forming a pair of plates consisting of a rare earth sintered magnet having the composition described above, (2) a step of applying copper plating to surfaces of the pair of plates, and applying nickel plating to the copper-plated surfaces to form a metal plating layer, (3) a step of performing a heat treatment on the pair of plates having the metal plating layer to form a metal oxide layer and/or a metal nitride layer, (4) a step of respectively adhering a pair of yokes to the pair of plates having the metal oxide layer and/or the metal nitride layer, and (5) a step of fixing the pair of yokes to each other with a support member such that the pair of plates adhered to the pair of yokes face each other and a gap is maintained between the pair of plates. Each step will be described in detail.

In the step of forming the pair of plates, first, an alloy having the composition described above is cast, the alloy is pulverized, and more preferably, the alloy is finely pulverized, and then formation in a magnetic field, sintering, and a heat treatment are sequentially performed on the alloy, thereby producing a sintered magnet.

More specifically, a raw material having the composition described above is dissolved by high-frequency dissolving in a non-oxidizing atmosphere such as argon, and it is cast. Next, the alloy is roughly pulverized, and then is pulverized up to an average particle diameter of preferably 1 μm to 10 μm without being particularly limited. The rough pulverization can be performed, for example, by a jaw crusher, a brown mill, a pin mill, hydrogen absorption, or the like in an inert gas atmosphere. In addition, the pulverization can be performed by a wet ball mill or an attritor using alcohol, hexane, or the like as a solvent, a dry ball mill in an inert gas atmosphere, a jet mill using an inert gas air flow, or the like.

Next, a fine pulverized powder is compression-molded by a magnetic field press machine or the like capable of applying a magnetic field of preferably 10 kOe or more, particularly 15 kOe or more, at a pressure of preferably 200 $kg/cm^2$ or more and less than 2000 $kg/cm^2$. Subsequently, the obtained compressed molded product is sintered in a heat treatment furnace in a high vacuum or a non-oxidizing atmosphere gas such as argon at 1000° C. to 1200° C. for 1 to 2 hours.

Subsequently, a heat treatment is performed in a vacuum or a non-oxidizing atmosphere gas such as argon at a temperature lower than the sintering temperature, preferably at a temperature of 400° C. to 700° C., to obtain a sintered magnet. The sintered magnet obtained in this manner is cut into a pair of plates having a predetermined shape and is polished to perform surface processing. At this time, chamfering is preferably performed on the rare earth sintered magnet body, without being particularly limited.

In the step of forming the metal plating layer, n (n is an integer) layers of the metal plating layers are formed on the pair of plates of the rare earth sintered magnet. Here, as the number of metal plating layers increases, a corrosion resistance is improved. Therefore, n is selected depending on the corrosion resistance required by the application or other conditions. In addition, in consideration of manufacturing, a cost, and efficiency, n is 2 to 5. A metal of the metal plating consists of Cu or Ni, and a plating thickness is 3 μm to 80 μm, particularly preferably 5 μm to 50 μm. More specifically, the multi-layer plating is a multi-layer plating in which Cu is formed on a lower layer and Ni is further formed thereon. A pretreatment before performing the metal plating is not particularly limited, and it is preferable that the pair of plates be subjected to an alkali degreasing, an acid cleaning, and a water washing. A method of forming the plating film is not particularly limited, and an electroplating method is desirable. In addition, a method of immersing the pair of plates in a plating liquid may be any of a barrel method or a hanging jig method, and may be appropriately selected according to dimension and shape of the pair of plates.

As an electroplating liquid, a known plating liquid having a known composition can be used, and the plating can be performed under a known condition according to the plating liquid, and the plating liquid having pH of 2 to 12 is particularly appropriate. In addition, in a case in which two or more layers of metals having different compositions are laminated, it is sufficient that relative to the uppermost layer, the layer immediately below has a nobler corrosion potential. In addition, in a method of controlling the potential by changing a sulfur content in the film as in a case of two-layer Ni plating, the sulfur content of the upper layer is set to approximately 0.03% or less, and the lower layer may not contain sulfur.

In the step of forming the metal oxide layer and/or the metal nitride layer, the pair of plates on which the metal plating layer is formed can be subjected to a heat treatment in an atmosphere such as air, under an oxygen partial pressure adjustment, under nitrogen, or under high pressure nitrogen, to oxidize or nitride the metal of the metal plating layer, thereby forming the metal oxide layer or the metal nitride layer. More specifically, in a case of forming the metal oxide layer, for example, it is preferable to perform a heat treatment at 200° C. to 600° C. for 3 to 50 hours in an argon, nitrogen, air, or low-pressure vacuum atmosphere in which an oxygen partial pressure is $10^{-4}$ Pa to 50 kPa. A total thickness of the metal plating layer and the metal oxide layer and/or the metal nitride layer is in a range of 3 μm to 80 μm, and a thickness of the metal oxide layer and/or the metal nitride layer is 0.01 μm to 2 μm. The thickness of the metal oxide layer and/or the metal nitride layer can be measured by an X-ray photoelectron spectroscopy (XPS) as described above.

In the step of adhering the pair of yokes to the pair of plates, as illustrated in FIGS. 1 to 4, the pair of plates on which the metal oxide layers and/or the metal nitride layers are formed are adhered to an inner surface of each yoke of the pair of yokes 1 and the pair of yokes 1A. An adhesive used for the adhesion will not be described here because of the above description.

In the step of fixing the pair of yokes to each other, as illustrated in FIGS. 1 to 4, for example, the plurality of pins 3 or the plurality of support columns 3A which is the bent yoke is used as the support members to fix the pair of yokes 1 and the pair of yokes 1A to each other such that the pair of plate-shaped magnets 2 and the pair of plate-shaped magnets 2A adhered to the pair of plate-shaped yokes 1 and the pair of plate-shaped yokes 1A face each other and a gap is maintained between the pair of plates. Therefore, it is possible to manufacture the magnetic circuit configuration components 10 and 10A for a voice coil motor, which include the pair of plate-shaped magnets 2 and the pair of plate-shaped magnets 2A consisting of a rare earth sintered magnet having a predetermined composition and having a predetermined coating on a surface.

EXAMPLES

Hereinafter, the present invention will be described in more detail with reference to Examples and Comparative Examples, and the present invention is not limited thereto.

Example 1

First, a magnet alloy was produced by blending a composition of Nd+Pr: 29.5% by weight, Co: 0.5% by weight, B: 0.9% by weight, Al, Cu, Zr, and Ga of 0.65% in total by weight as an additive, and the balance of Fe, and dissolving the blending in a high-frequency dissolving furnace using an alumina crucible and casting the blending in a mold in an argon gas atmosphere.

Next, the magnet alloy was roughly pulverized to approximately 500 μm or less by using a jaw crusher and a brown mill, and was then finely pulverized to an average particle diameter of approximately 3 μm by using a jet mill with a nitrogen stream. The obtained fine pulverized powder was molded in a magnetic field of 10 kOe at a pressure of 1.2 t/cm$^2$ by a magnetic field press machine. The obtained molded product was sintered in an argon atmosphere at 1070° C. for 2 hours by using a heat treatment furnace, was cooled, and was then further heat-treated in an argon atmosphere at 600° C. for 1 hour to produce a sintered magnet. The obtained sintered magnet was clipped into an arc-shaped plate having the same shape as a shape of a magnet for a VCM.

Electrolytic Cu plating (10 μm) and electrolytic Ni plating (10 μm) were sequentially applied to the arc-shaped plate. In this case, electrolytic Cu plating was performed by using a plating bath adjusted with 60 g/L of copper pyrophosphate, 240 g/L of potassium pyrophosphate, and 30 g/L of potassium oxalate under a condition of a bath temperature of 40° C. and a current density of 1.5 A/dm$^2$, and then electrolytic Ni plating was performed by using a plating bath adjusted with 40 g/L of nickel chloride, 270 g/L of nickel sulfate, and 30 g/L of boric acid under a condition of a bath temperature of 50° C. and a current density of 2.0 A/dm$^2$. Thereafter, a heat treatment in air was executed under a condition of 350° C.×10 hours, and the arc-shaped plate was slowly cooled to room temperature to obtain a test sample (Example 1).

Comparative Example 1

In addition, as a comparison, another test sample was obtained in the same manner as in Example 1, except that the electrolytic Cu plating (10 μm) and the electrolytic Ni plating (10 μm) were sequentially performed on the arc-shaped plate and the heat treatment was not performed (Comparative Example 1), unlike Example 1 in which the heat treatment was performed after the electrolytic Ni plating (10 μm) and the electrolytic Ni plating (10 μm) were sequentially performed on the arc-shaped plate.

Hydrogen Exposure Test

Each test sample of Example 1 and Comparative Example 1 was put into a pressure-resistant container and exposed to a hydrogen atmosphere (0.29 MPa and 100° C.) for 7 days, and Flux (total magnetic flux), a demagnetization curve, and a torque in a rotation direction of a swing arm of the voice coil motor were measured, and appearances and tissues of cross sections of the test samples were observed before hydrogen exposure, after 4 days of the hydrogen exposure, after 5 days of the hydrogen exposure, after 6 days of the hydrogen exposure, and after 7 days of the hydrogen exposure. The Flux and the demagnetization curve were measured for two test samples of each of Example 1 and Comparative Example 1.

Figure 5:
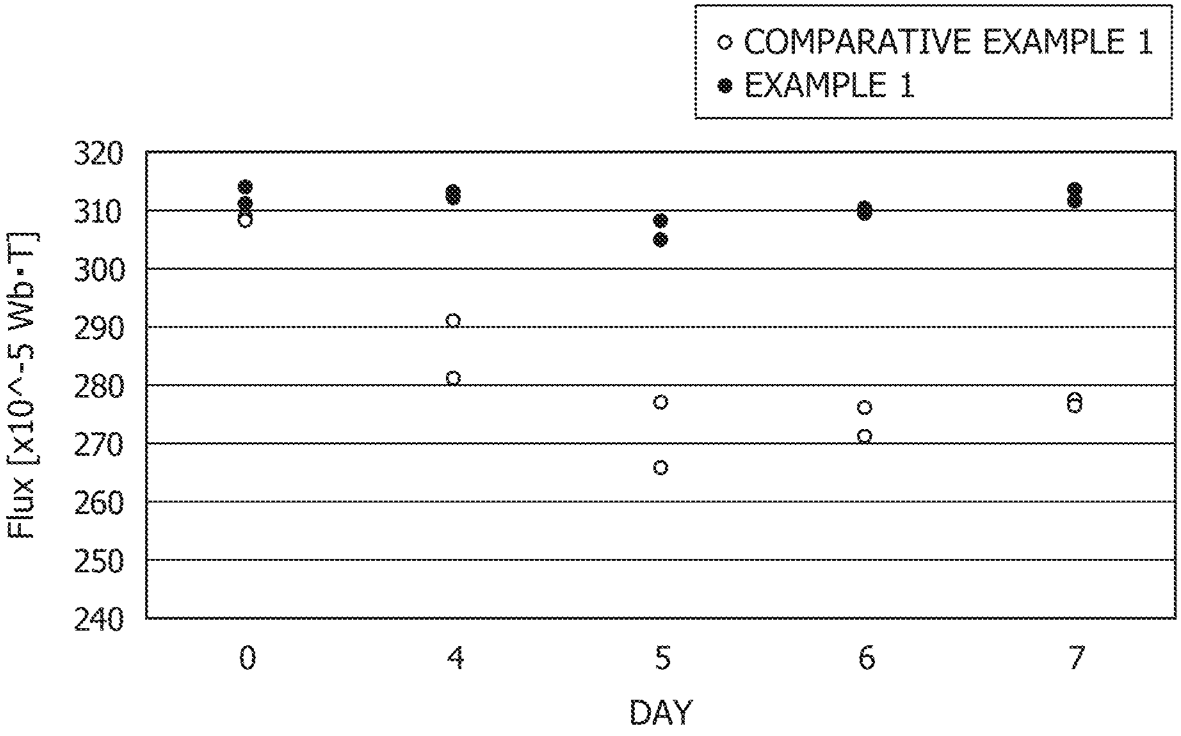
FIG. 5 is a graph illustrating a measurement result of Flux of sintered magnets of Example 1 and Comparative Example 1.

The Flux was measured by using a flux meter (manufactured by Magnet-Force Co., Ltd., model number TFM-2000) to measure the Flux (unit: Wb·T). As a search coil, a coil of a diameter of 70 μm copper wire×100 turns was used. Measurement results of Flux of Example 1 and Comparative Example 1 are shown in FIG. 5.

Figure 6:
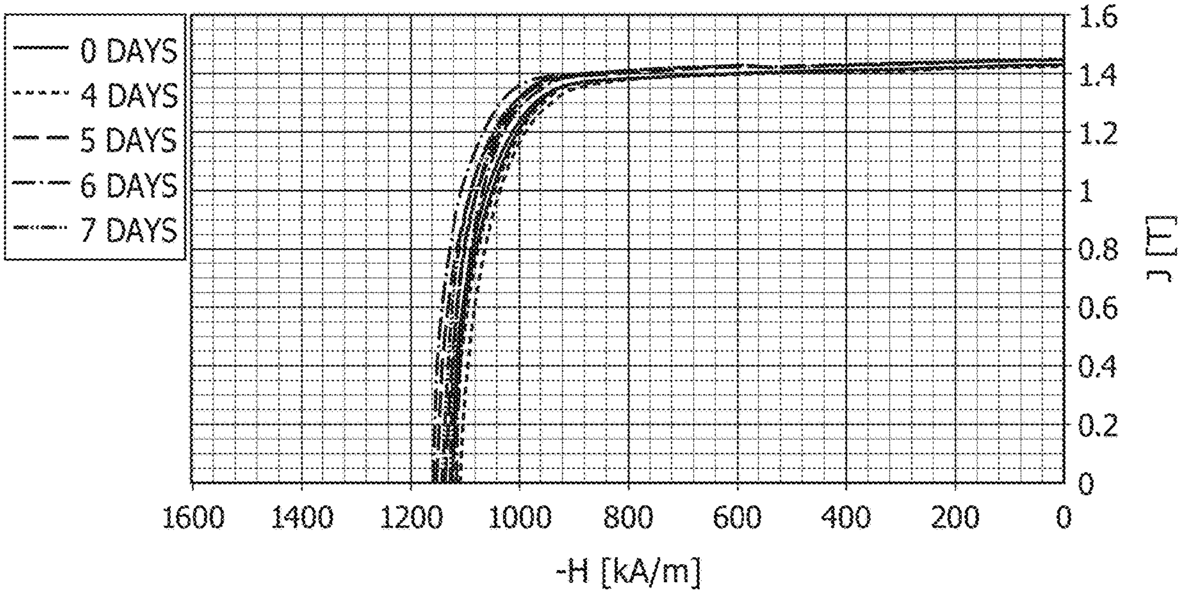
FIG. 6 is a graph illustrating a demagnetization curve of the sintered magnet of Example 1.
Figure 7:
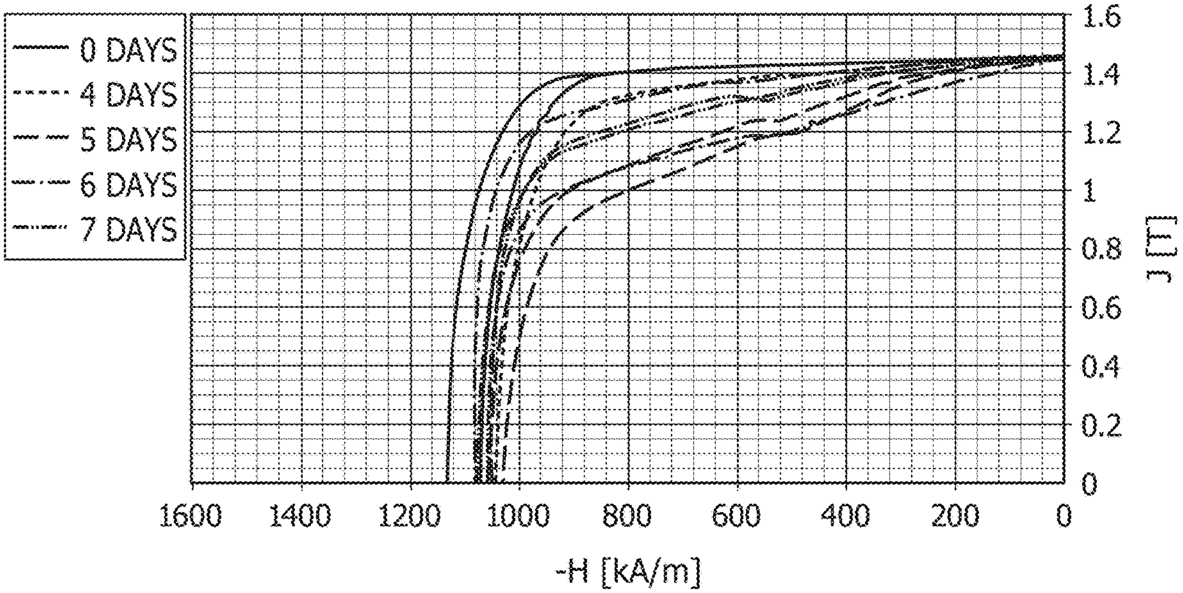
FIG. 7 is a graph illustrating a demagnetization curve of the sintered magnet of Comparative Example 1.

In the demagnetization curve, as magnetic properties of the test samples, a residual magnetic flux density Br (unit: T), an intrinsic coercivity HcJ (unit: kA/m), a coercivity HcB (unit: kA/m), and a maximum energy product (BH) max (KJ/m$^3$) were measured by using a vibrating sample magnetometer (manufactured by Riken Denshi Co., Ltd.). Then, based on these measurement results, a J-H curve in which a magnetic field H was plotted on a horizontal axis and a magnetization J was plotted on a vertical axis was obtained. FIG. 6 and FIG. 7 each illustrates a demagnetization curve (J-H curve) of Example 1 and Comparative Example 1.

Figure 8:
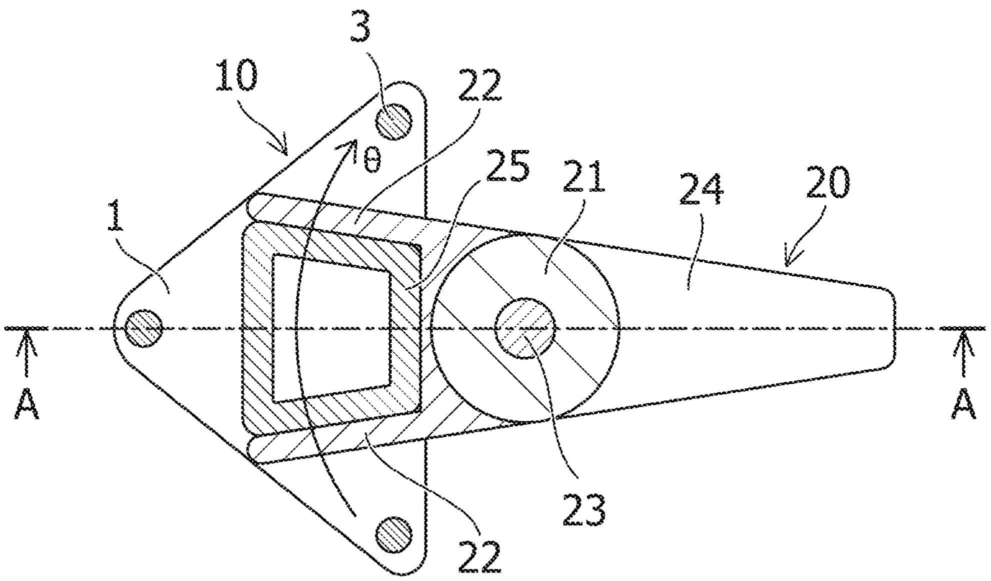
FIG. 8 is a schematic plan cross-sectional diagram illustrating a magnetic circuit configuration component and a torque measurement component for the VCM for describing measurement of torque.
Figure 9:
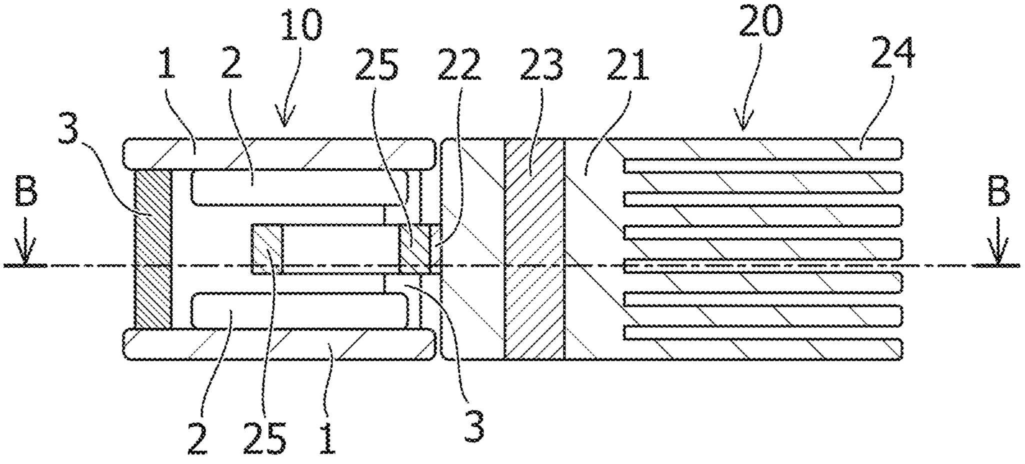
FIG. 9 is a schematic side cross-sectional diagram of the magnetic circuit configuration component for the VCM and the torque measurement component taken along a line A-A of FIG. 8.

The torque in the rotation direction of the swing arm was measured by producing the magnetic circuit configuration component 10 for a VCM using a test sample as the magnet 2, and attaching a torque measurement component 20 to the magnetic circuit configuration component 10, as illustrated in FIGS. 8 and 9. FIG. 9 is a side cross-sectional diagram of the magnetic circuit configuration component 10 for the VCM and the torque measurement component 20 taken along a line A-A illustrated in FIG. 8, and FIG. 8 is a plan cross-sectional diagram of the magnetic circuit configuration component 10 for the VCM and the torque measurement component 20 taken along the line B-B illustrated in FIG. 9. In FIG. 8, the magnet 2 is omitted in the magnetic circuit configuration component 10 for the VCM for the sake of clarification of the drawing. Since the magnetic circuit configuration component 10 for the VCM is already described, description thereof will be omitted here.

The torque measurement component 20 includes a main body 21 having a rotation shaft 23, a swing arm 22 having a through-hole for passing through the rotation shaft 23 on a center line and having a tip portion that is divided into two, an air core coil 25 that is sandwiched between the tip portions divided into two of the swing arm 22, an angle sensor (not illustrated) for measuring an angle of the swing arm 22, and a torque sensor (not illustrated) for measuring a torque in a rotation direction of the swing arm 22. The swing arm 22 is rotatably supported by the rotation shaft 23. An end portion 24 of the main body 21 on a side opposite to the swing arm 22 has a comb-like shape. The magnetic circuit configuration component 10 for the VCM here is a magnetic circuit for a VCM in which the magnet 2 is attached to the yoke 1, and then tip surface 2-pole magnetization is executed by setting a center of the magnet 2 in a radial direction to a center of a neutral zone (a center of a boundary zone of a magnetic pole).

In the torque measurement, the swing arm 22 of the torque measurement component 20 was rotated while a current was passed through the air core coil 25 by a constant voltage power supply (not illustrated), and values of the angle sensor and the torque sensor of the torque measurement component 20 were read to measure a torque at an angle of each swing arm. In the measurement, if a position of the center line of the swing arm 22 was at the center of the neutral zone of the pair of magnets 2 respectively magnetized to two poles was defined as an angle of 0°. In addition, in the measurement, the current was made to flow in two directions, that is, positive and negative directions, and an average value of absolute values of the currents was used as the torque value at that angle.

The observation of the appearance of the test sample was visually performed. In addition, the cross section tissue of the test sample was observed with a scanning electron microscope (manufactured by JEOL Ltd.).

As a result of observation of the appearance of the test sample, in Example 1, no damage such as chipping and cracking was checked in any test sample after the hydrogen exposure. As illustrated in FIG. 5, Flux of Example 1 maintained a value of around $310\times10^{-5}$ Wb/T, which was the measurement result before the hydrogen exposure (0 days), even after 7 days had passed since the hydrogen exposure. In addition, as illustrated in FIG. 6, even after 7 days had passed since the hydrogen exposure, the demagnetization curve (J-H curve) maintained the same squareness as a squareness before the hydrogen exposure (0 days).

On the other hand, in Comparative Example 1 in which the heat treatment was not performed after the metal plating, as a result of using a large number of test samples in the hydrogen exposure test, it was found that 4% of the test samples were damaged by chipping, cracks, or the like after 4 days of the hydrogen exposure, 15% of the remaining test samples were damaged after 5 days of the hydrogen exposure, 54% of the remaining test samples were damaged after 6 days of the hydrogen exposure, and 36% of the remaining test samples were damaged after 7 days of the hydrogen exposure. In this manner, it was confirmed that, by the formation of the metal oxide by the heat treatment after the metal plating in Example 1, it is possible to prevent a damage such as chipping, cracks, and the like from occurring in the magnet.

In addition, in Flux of Comparative Example 1, as illustrated in FIG. 5, even though the measurement was performed on the test sample without damage, Flux was around $310\times10^{-5}$ Wb/T before the hydrogen exposure (0 days), was decreased up to approximately 280 to $290\times10^{-5}$ Wb/T after 4 days from the hydrogen exposure, and was decreased up to approximately 270 to $280\times10^{-5}$ Wb/T after 5 days from the hydrogen exposure.

In addition, regarding the demagnetization curve (J-H curve), as illustrated in FIG. 7, even in Comparative Example 1 in which the magnetic properties of the test samples without damage were measured, none of the test samples after the hydrogen exposure could maintain squareness of the test sample before the hydrogen exposure. If a current flows through the coil in the magnetic field of the magnet, the VCM causes the actuator to perform a reciprocating motion by utilizing generation of a force in a direction perpendicular to both the magnetic field and the current according to Fleming's left-hand rule. Since the actuator is precisely controlled by generating a thrust proportional to the energization current, if the magnetic properties of the magnet deteriorate by the hydrogen exposure as illustrated in FIG. 7 and the constant magnetization J is not able to be maintained in a predetermined range of the magnetic field H, the actuator is not able to be precisely controlled, and data is not able to be read or written.

In the test sample of Comparative Example 1, which was 4 to 7 days after the hydrogen exposure and had no damage, the cross section tissue was observed, and as a result, no abnormality was particularly found in the Ni plating layer on the surface or the magnet below the Ni plating layer. In addition, as a result of observing the cross section tissue of the test sample of Example 1 after 4 to 7 days from the hydrogen exposure, no abnormality was particularly found in the metal oxide layer on the surface, the Ni plating layer, the Cu plating layer, and the magnet below the metal oxide layer.

In addition, test samples of magnet alloys were produced by sequentially executing electrolytic Cu plating (10 μm) and electrolytic Ni plating (10 μm) in the same manner as in Example 1, and executing a heat treatment in air under a condition of 300° C.×20 hours in Example 2 and under a condition of 400° C.×5 hours in Example 3, respectively, on a composition of Nd+Pr: 28.5% by weight, Dy: 1.0% by weight, Co: 0.5% by weight, B: 0.9% by weight, Al, Cu, Zr, and Ga of 0.60% in total as an additive, and the balance of Fe in Example 2 and a composition of Nd+Pr: 33.0% by weight, Co: 1.0% by weight, B: 1.0% by weight, Al, Cu, Zr, and Ga of 0.75% in total as an additive, and the balance of Fe in Example 3, instead of the composition of the magnet alloy of Example 1. In addition, as a comparison, a plating treatment in the same manner as Comparative Example 1 was performed on the magnet alloy described above to obtain test samples of Comparative Example 2 and Comparative Example 3.

Figure 10:
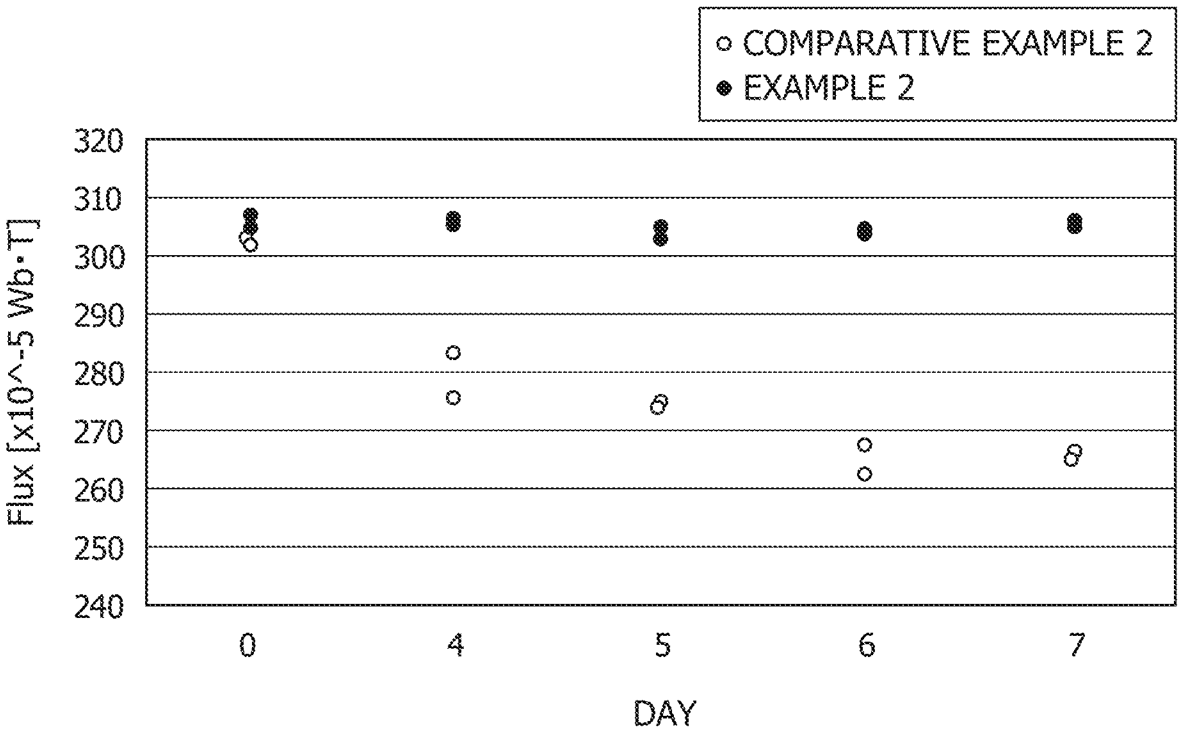
FIG. 10 is a graph illustrating a measurement result of Flux of sintered magnets of Example 2 and Comparative Example 2.
Figure 11:
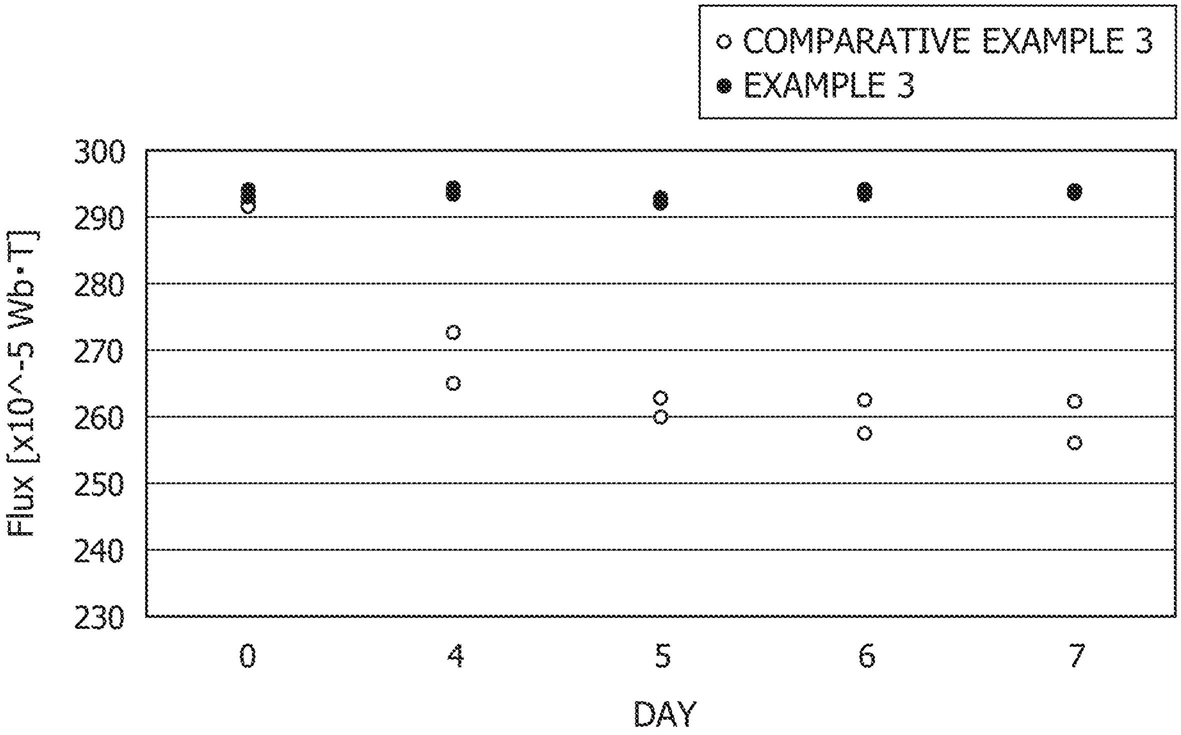
FIG. 11 is a graph illustrating a measurement result of Flux of sintered magnets of Example 3 and Comparative Example 3.

The same hydrogen exposure test as described above was performed on the test samples of Examples 2 and 3 and Comparative Examples 2 and 3, and Flux was measured. FIG. 10 illustrates the measurement results of Flux of Example 2 and Comparative Example 2, and FIG. 11 illustrates the measurement results of Flux of Example 3 and Comparative Example 3. As illustrated in FIGS. 10 and 11, the same results as the composition of the magnet alloy of Example 1 were obtained for the compositions of the magnet alloys of Examples 2 and 3.

Furthermore, if a thickness of the metal oxide layer on the surface of the test sample of Example 1 was measured by using an X-ray photoelectron spectroscopy device (manufactured by Shimadzu Kratos Inc., AXIS-HSI), the thickness was approximately 0.05 μm.

Figure 12:
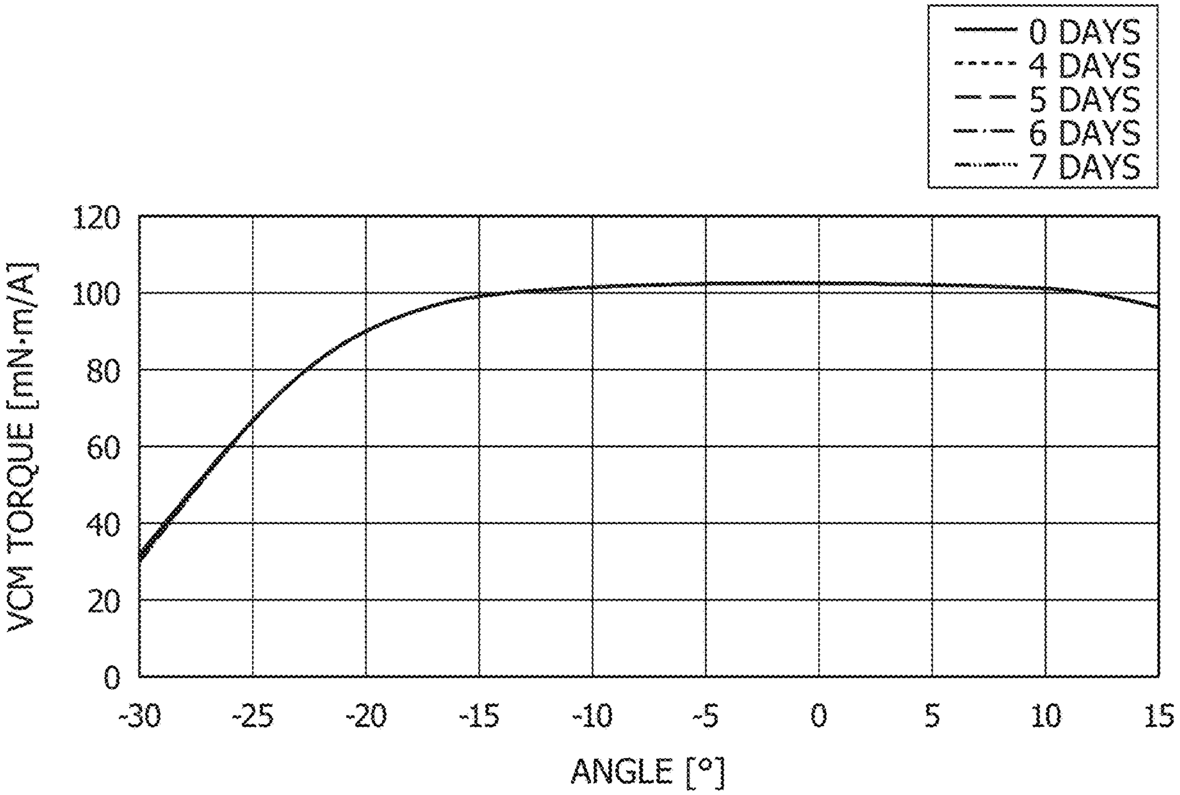
FIG. 12 is a graph illustrating a measurement result of torque of Example 4.

A magnetic circuit configuration component for a VCM was produced by using a test sample (Example 4) which was created by the same procedure as in Example 1 and in which a pair of rare earth magnets were respectively magnetized to two poles in a magnetic field of 3 T, and a torque was measured as described above. Hydrogen exposure conditions of the test sample were also the same as in Example 1, and the test sample was produced and measured by using each hydrogen exposure condition. The results thereof are illustrated in FIG. 12. As illustrated in FIG. 12, the same torque as the torque before the hydrogen exposure (0 days) was maintained even after 7 days had passed from the hydrogen exposure at any angle.

Figure 13:
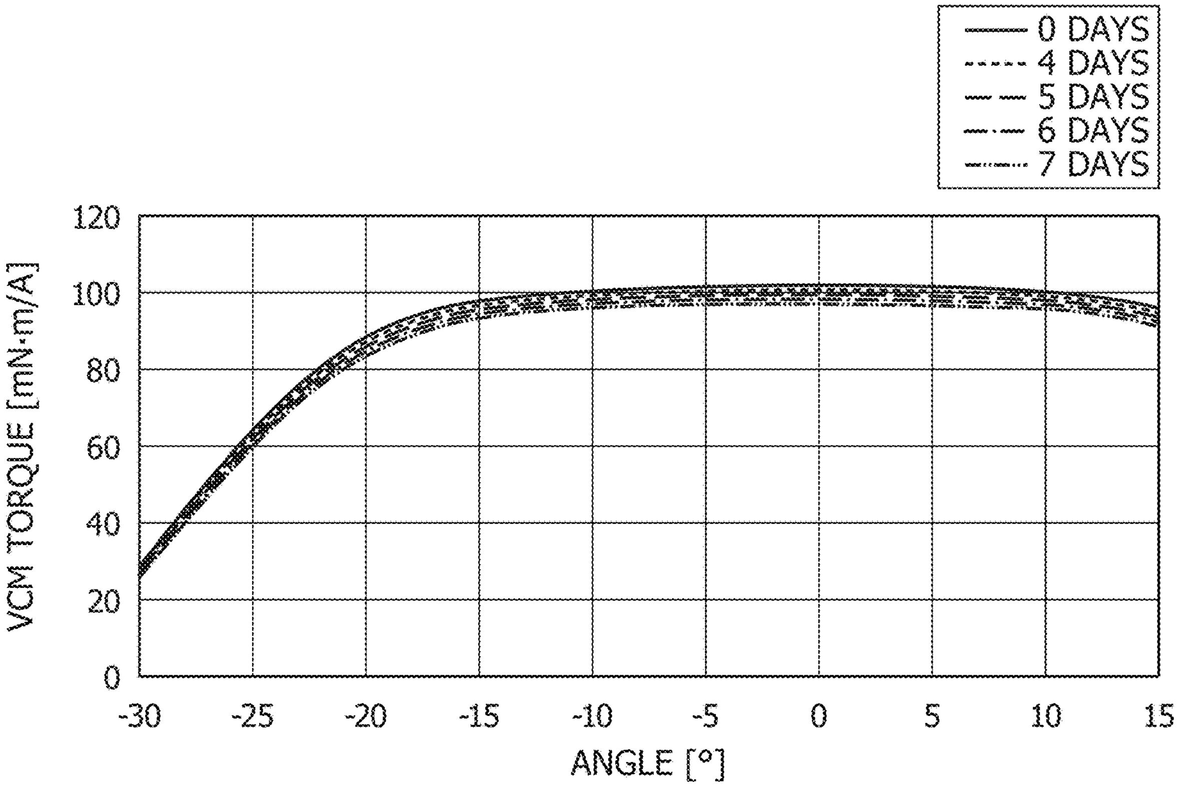
FIG. 13 is a graph illustrating a measurement result of torque of Comparative Example 4.

By using a test sample (Comparative Example 4) which is created by the same procedure as in Comparative Example 1 and in which a pair of rare earth magnets were respectively magnetized to two poles in a magnetic field of 3 T, a torque was measured in the same manner as in Example 4. The results thereof are illustrated in FIG. 13. As illustrated in FIG. 13, in Comparative Example 4, the torque was decreased at any angle, in accordance with an exposure time in hydrogen.

Figure 14:
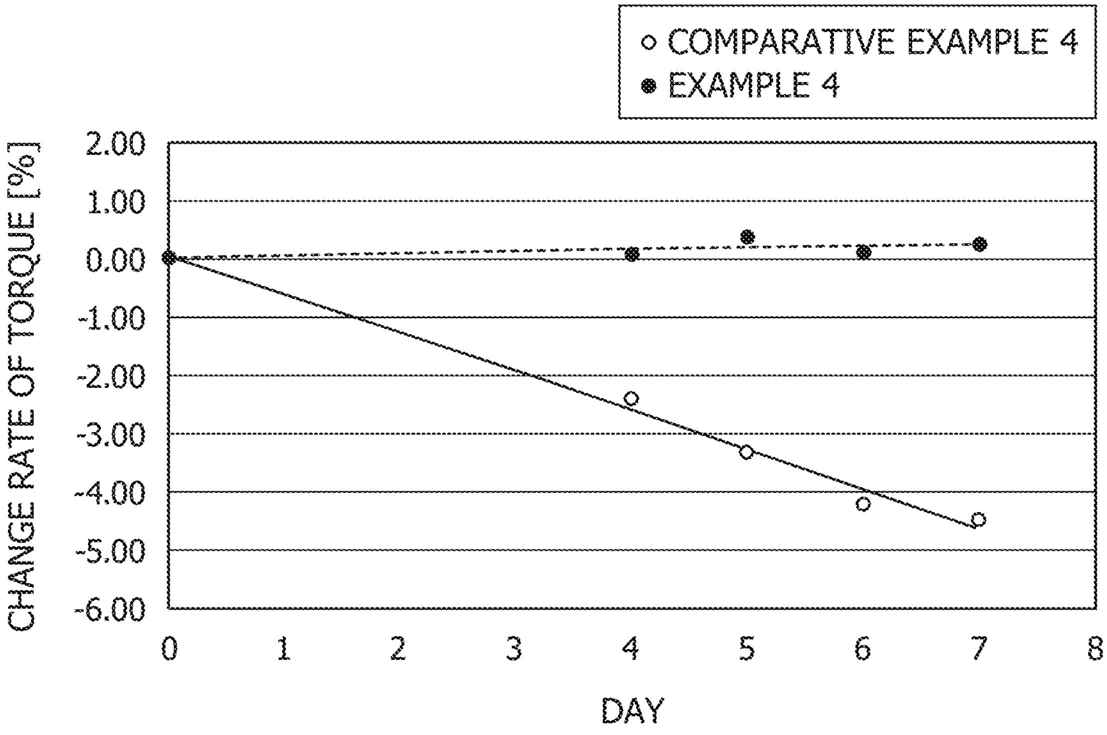
FIG. 14 is a graph illustrating a change rate of torque of Example 4 and Comparative Example 4.

In order to more closely analyze the maintenance and decrease of the torque, from the torque measurement results of Examples 4 and Comparative Example 4 described above, the maximum value of the torque at each exposure time was obtained, and a rate of change in the maximum value of the torque before and after the exposure (the maximum value of the torque before the exposure was set to 100) was calculated. The results thereof are illustrated in FIG. 14. As illustrated in FIG. 14, in Comparative Example 4, the exposure time was increased, and the torque was decreased, and a decrease of 4.4% was observed in the exposure for 7 days. On the other hand, in Example 4, a decrease in torque was not observed.

In this manner, it has been checked that, by performing the heat treatment after the metal plating of the magnet to form the metal oxide on the surface, it is possible to reliably prevent the occurrence of the damage such as chipping and cracking by the hydrogen exposure, and it has been found that damage such as chipping and cracking by hydrogen exposure can be reduced to some extent even with only the metal plating. In addition, even if such damage did not occur, it has been confirmed that, in the comparative example with only the metal plating, the magnetic properties of the magnet deteriorated, and the magnet could not be used as a magnet for a VCM.

REFERENCE SIGNS LIST

1, 1A: Yoke
2, 2A: Magnet
3: Pin
3A: Yoke-bent support column
10, 10A: Magnetic circuit configuration component for voice coil motor (VCM)
20: Torque measurement component
22: Swing arm
23: Rotation shaft
25: Air core coil

What is claimed is:

1. A magnetic circuit configuration component for a voice coil motor, comprising:

a pair of yokes;

a pair of magnets respectively provided in contact with inner surfaces of the pair of yokes; and a support member that maintains a gap between the pair of magnets and fixes the pair of yokes to each other, wherein the magnet is a rare earth sintered magnet having a surface on which coating is performed, the rare earth sintered magnet has a composition consisting of R (R is one or two or more types of rare earth elements selected from Nd, Pr, Dy, Tb, Ce, La, and Gd) of 28% to 34% by weight, Co of 2% or less by weight, B of 0.5% to 2% by weight, at least one type of element selected from Ni, Nb, Al, Ti, Zr, Cr, V, Mn, Mo, Si, Sn, Ga, Cu, and Zn as an additive of 2% or less by weight, and the balance of Fe with inevitable impurities, and the coating has a multi-layer structure consisting of a metal plating layer and a metal oxide layer and/or a metal nitride layer in order from a rare earth sintered magnet side, the metal plating layer further has a multi-layer structure consisting of a copper plating layer and a nickel plating layer in order from the rare earth sintered magnet side, a total thickness of the metal plating layer and the metal oxide layer and/or the metal nitride layer is in a range of 3 μm to 80 μm, and a thickness of the metal oxide layer and/or the metal nitride layer is in a range of 0.01 μm to 0.05 μm.

2. A voice coil motor comprising:

the magnetic circuit configuration component for a voice coil motor according to claim 1; and a coil that is located in the gap between the pair of magnets.

3. A method for manufacturing a magnetic circuit configuration component for a voice coil motor, the method comprising:

forming a pair of plates consisting of a rare earth sintered magnet having a composition consisting of R (R is one or two or more types of rare earth elements selected from Nd, Pr, Dy, Tb, Ce, La, and Gd) of 28% to 34% by weight, Co of 2% or less by weight, B of 0.5% to 2% by weight, at least one type of element selected from Ni, Nb, Al, Ti, Zr, Cr, V, Mn, Mo, Si, Sn, Ga, Cu, and Zn as an additive of 2% or less by weight, and the balance of Fe with inevitable impurities;

applying copper plating to surfaces of the pair of plates and applying nickel plating to the copper-plated surfaces to form metal plating layers;

performing a heat treatment on the pair of plates on which the metal plating layers are formed to oxidize and/or nitride a metal of the metal plating layer, to form a metal oxide layer and/or a metal nitride layer, wherein a total thickness of the metal plating layer and the metal oxide layer and/or the metal nitride layer is in a range of 3 μm to 80 μm, and a thickness of the metal oxide layer and/or the metal nitride layer is in a range of 0.01 μm to 0.05 μm;

respectively adhering a pair of yokes to the pair of plates on which the metal oxide layers and/or the metal nitride layers are formed; and fixing the pair of yokes to each other with a support member such that the pair of plates adhered to the pair of yokes face each other and a gap is maintained between the pair of plates.

* * * * *